United States Patent [19]

Rietberg et al.

[11] Patent Number: 4,970,096
[45] Date of Patent: Nov. 13, 1990

[54] COATING MATERIALS CURING AT ROOM TEMPERATURE

[75] Inventors: Johan Rietberg; Johannes C. Van Roon, both of Zwolle, Netherlands

[73] Assignee: Stamicarbon B.V., Geleen, Netherlands

[21] Appl. No.: 274,770

[22] Filed: Nov. 23, 1988

[30] Foreign Application Priority Data

Nov. 28, 1987 [NL] Netherlands ................... 8702858

[51] Int. Cl.$^5$ ............................... B05D 3/02
[52] U.S. Cl. ................... 427/340; 427/385.5; 524/521; 524/555
[58] Field of Search ............ 427/340, 385.5; 524/521, 555

[56] References Cited

U.S. PATENT DOCUMENTS 3,189,581 6/1965 Hart et al. .................. 524/555 X

*Primary Examiner*—Michael Lusignan
*Attorney, Agent, or Firm*—Cushman, Darby & Cushman

[57] ABSTRACT

The invention relates to the application of a resin composition containing
  (1) 20-85 parts by weight of an alkoxy groups containing polymer consisting of
    (a) 1-40 wt. % ($C_1$-$C_6$) alkoxymethyl ether of acryl- or methacrylamide
    (b) 20-85 wt. % ($C_1$-$C_{12}$) alkyl esters of acrylic or methacrylic acid
    (c) 0-40 wt. % hydroxyalkyl(meth)acrylate, acrylic or methacrylic acid, acryl- or methacrylamide or mixtures thereof
    (d) 0-50 wt. % vinylaromatic compound and
    (e) 0-40 wt. % other monomers
  (2) 0-80 parts by weight of hydroxy, carboxy or amide containing polymer and
  (3) 15-60 parts by weight of organic solvents in a coating material curing at room temperature.

9 Claims, No Drawings

COATING MATERIALS CURING AT ROOM TEMPERATURE

The invention relates to coating materials curing at room temperature. Such coating materials contain a resin composition that hardens at a temperature between 5° C. and 60° C. in the presence of an acid catalyst.

Such coating materials are known from the brochure "Furniture Finishes" (a publication by Synres in 1970). However, these methylol groups containing systems curing at room temperature give high formaldehyde emissions while curing and, as appears from the article "Umweltschadstoff Formaldehyde: Belastungssituation und Regelungen" (Adhäsion 1986, Heft 11, pp. 17–28), such formaldehyde emissions must be limited on account of environmental considerations. As a consequence, resin compositions that release formaldehyde (during processing and/or from the end product) are often not acceptable any more as feedstocks for coating materials because their high formaldehyde emissions are no longer compatible with the prevailing environmental standards.

The object of the invention is to provide, through application of a resin composition, coating materials curing at room temperature which on the one hand give formaldehyde emissions that meet the existing environmental standards and on the other, possess the properties that are required of good coating materials.

The resin composition according to the invention, is characterized in that it contains (1) 20–85 parts by weight of an alkoxy groups containing polymer consisting of
  (a) 1–40 wt. % ($C_1$–$C_6$)-alkoxymethyl ether of acryl- or methacrylamide
  (a) 20–85 wt. % ($C_1$–$C_{12}$)-alkyl esters of acrylic or methacrylic acid
  (c) 0–40 wt. % hydroxyalkyl(meth)acrylate, acrylic or methacrylic acid, acryl- or methacrylamide or mixtures thereof
  (d) 0–50 wt. % vinylaromatic compound and
  (e) 0–40 wt. % other monomers
(2) 0–80 parts by weight of hydroxy, carboxy or amide containing polymer and
(3) 15–60 parts by weight of organic solvent.

It has been found that the use of ($C_1$–$C_6$)-alkoxymethyl ethers of acryl- or methacrylamide as cross-linking agent in copolymers results in coating materials with a very low formaldehyde emission.

The ($C_1$–$C_6$)-alkoxymethyl ethers of acryl- or methacrylamide can be represented by the formula:

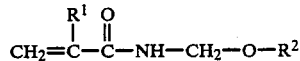

where
$R^1$ = H or $CH_3$
$R^2$ = ($C_1$–$C_6$)alkyl.

According to a preferred embodiment the polymer contains 10–25 wt. % of this alkoxymethyl ether.

According to another preferred embodiment of the invention, $R^2$ = ($C_1$–$C_4$)alkyl.

According to yet another preferred embodiment of the invention, isobutoxymethylmethacrylamide and/or methoxymethylmethacrylamide is/are used as ($C_1$–$C_6$)-alkoxymethyl ether of acryl- or methacrylamide.

Other suitable ($C_1$–$C_6$)-alkoxymethyl ethers of acryl- or methacrylamide are for instance n-butoxymethyl(meth)acrylamide, ethoxymethyl(meth)acrylamide, propoxymethyl(meth)acrylamide and cyclohexylmethyl(meth)acrylamide or mixtures thereof.

The amidealkylol ether groups are in general present in the form of units of methoxymethyl-, n-butoxymethyl- or isobutoxymethyl(meth)acrylamide or mixtures thereof.

Suitable ($C_1$–$C_{12}$)alkyl esters of acrylic or methacrylic acid are for instance ethyl(meth)acrylate, methyl(meth)acrylate, butyl(meth)acrylate, hexyl(meth)acrylate and ethylhexyl(meth)acrylate or mixtures thereof, being present in the polymer in quantities of between 20 and 85 wt. %.

Suitable hydroxyalkyl(meth)acrylates are for instance 2-hydroxyethyl(meth)acrylate, 2-hydroxypropyl(meth)acrylate, hydroxybutyl(meth)acrylate or mixtures thereof. These acrylates are present in the polymer in quantities of between 0 and 25% wt. %, and if present preferably between 5 and 15 wt. %.

Suitable vinylaromatic compounds are styrene, alkylstyrene such as methylstyrene, and vinyltoluene or mixtures thereof. These vinylaromatic compounds are present in the polymer in quantities of between 0 and 50 wt. %, and if present preferably between 20 and 40 wt. %.

Other suitable monomers are for instance vinylmonomers, such as acrylates, acrylonitrile, ethylene together with vinylchloride, vinyl compounds, for instance vinyl esters, such as vinylacetate, vinylpropionate, vinylbutyrate and vinylbenzoate, vinyl esters of $C_9$ and/or $C_{10}$ carboxylic acid, and vinyl ethers, such as butylvinyl ether, vinylisobutyl ether and vinyloctyl ether, butadiene and/or isoprene. These monomers are present in the polymer in quantities of between 0 and 40 wt. %, preferably between 0 and 20 wt. %.

Suitable organic solvents are for instance saturated aliphatic alcohols, such as ethanol, isopropanol and butanol, hydroxy ethers, hydroxy esters, aromatic hydrocarbons, such as toluene and xylene, ethers, esters and ketones or mixtures thereof.

According to a preferred embodiment of the invention the resin composition, containing 15–60 parts by weight of organic solvent, contains at least 5 wt. % alcohol with 1–12 carbon atoms (relative to the alkoxy groups containing polymer). Also with a catalyst, the composition is then very stable (long 'pot life').

The resin composition may further contain the usual additives, such as pigments, dyestuffs, fillers, thickening agents, flow agents, flatting agents, stabilizers and/or siccatives.

Suitable acid catalysts, used in quantities of between 0.5 and 10 wt. %, preferably between 1 and 3 wt. %, are sulphonic acid, paratoluene sulphonic acid, camphor sulphonic acid, phosphoric acid, esters of phosphoric acid, dinonylnaphthalene sulphonic acid, methane sulphonic acid and/or hydrochloric acid.

The temperature at which the curing takes place is between 5° and 60° C., preferably between 15° and 30° C., more in particular at room temperature.

The alkoxy groups containing polymer can be prepared by all known polymerization processes for acrylate polymers, preferably by a solution polymerization process. Such a solution polymerization is preferably effected in the presence of at least 5 wt. % (relative to the alkoxy groups containing polymer) of a hydroxyl groups containing solvent.

The crosslinking reaction takes place due to the alkoxymethyl ether reacting with the acid, amide or hydroxy groups. Depending on the application and desired properties, these reactive groups may be present in the polymer containing hydroxy, carboxy or amide groups as well as in the polymer containing alkoxy groups, also being present hydroxyalkyl(meth)acrylate, (meth)acrylic acid and/or (meth)acrylamide, preferably in a quantity of between 5 and 15 wt. %.

According to a preferred embodiment of the invention the alkoxy groups containing polymer consists of:
(a) 1–40 wt. % ($C_1$–$C_6$)-alkoxymethyl ether of acryl- or methacrylamide
(b) 20–85 wt. % ($C_1$–$C_{12}$)-alkyl esters of acrylic or methacrylic acid
(c) 5–15 wt. % hdyroxyalkyl(meth)acrylate, acrylic or methacrylic acid, acryl- or methacrylamide or mixtures thereof
(d) 0–50 wt. % vinylaromatic compound and
(e) 0–40 wt. % other monomers.

According to another preferred embodiment, hydroxyalkyl(meth)acrylate is used as component (c).

According to yet another preferred embodiment of the invention the resin composition contains
(1) 20–85 parts by weight of an alkoxy groups containing polymer consisting of
   (a) 1–40 wt. % ($C_1$–$C_6$) alkoxymethylether of acryl- or methacrylamide
   (b) 20–85 wt. % ($C_1$–$C_6$) alkylesters of acrylic or methacrylic acid
   (c) 0–5 wt. % hydroxyalkyl(meth)acrylate, acrylic or methacrylic acid, acryl- or methacrylamide or mixtures thereof
   (d) 0–50 wt. % vinylaromatic compound and
   (e) 0–40 wt. % other monomers
(2) 10–80 parts by weight of hydroxy, carboxy or amide containing polymer
(3) 15–60 parts by weight of organic solvent.

Suitable hydroxy, carboxy or amide containinig polymers are for instance hydroxyacrylate, polyhydroxylamideacrylate, polyhydroxylcarboxylacrylate and/or polyhydroxypolyester.

It is pointed out that GB-A-1090172 describes stoving paints in which polymer compositions are used similar to those according to the present invention. However, stoving systems and systems curing at room temperature are completely different systems. Stoving is effected at temperatures between 120° C. and 200° C. The formaldehyde question, which has thus far been a serious problem with systems curing at room temperature, does not present itself with stoving systems. With these systems, of which GB-A-1090172 is an example, the formaldehyde is exhausted in the plant and, if necessary, burned subsequently, while after the curing no formaldehyde emission occurs.

Owing to the application of the resin composition the invention results in coating materials which in addition to the low formaldehyde emission have good coating properties, such as surface drying, through-drying solvent resistance, hardness, chemical resistance, gloss and scrach resistance.

The environmental requirements (which are going to be) set for formaldehyde emissions are increasingly becoming (still) severer. For some measurement methods with respect to these emissions, reference is made to the Proceedings Fatipec 1982, Liege, Volume II, pp. 133–153.

The coating materials according to the invention are meant for use in particular in wood paints (for instance furniture applications, kitchen applications and panels) and paints for plastics.

The invention will be further elucidated with reference to the following examples, without however being restricted thereto.

EXAMPLES I-XV

Preparation of the polymer

The polymerization (for the components used, see Table 1) was effected by the following method:
(a) supplying solvent and, if necessary, amine to the reactor;
(b) heating up to the temperature at which the solvent boils;
(c) for a period of three hours, supplying monomers, peroxide and, if necessary, mercaptan;
(d) for two hours, keeping at the reflux temperature;
(e) cooling down and draining.

Table 2 gives the physical constants viscosity, solids content, acid number and hydroxyl number belonging to the polymers I-XV.

TABLE 1

| | I wt. % | II wt. % | III wt. % | IV wt. % | V wt. % | VI wt. % | VII wt. % | VIII wt. % | IX wt. % | X wt. % | XI wt. % | XII wt. % | XIII wt. % | XIV wt. % | XV wt. % |
|---|---|---|---|---|---|---|---|---|---|---|---|---|---|---|---|
| butanol | 14.3 | 0 | 0 | 0 | 31.6 | 0 | 0 | 49.3 | 22.1 | 25.3 | 22.1 | 0 | 0 | 22.1 | 0 |
| methoxypropanol | 0 | 0 | 0 | 14.3 | 8.3 | 0 | 0 | 0 | 0 | 0 | 0 | 0 | 0 | 0 | 8.7 |
| butylacetate | 14.3 | 27.5 | 27.7 | 0 | 0 | 21.5 | 21.3 | 0 | 27.5 | 0 | 27.5 | 0 | 0 | 0 | 40.8 |
| isopropanol | 0 | 0 | 2.2 | 0 | 0 | 17.9 | 0 | 0 | 0 | 0 | 0 | 49.6 | 0 | 0 | 0 |
| ethanol | 0 | 22.1 | 0 | 0 | 0 | 0 | 17.8 | 0 | 0 | 0 | 0 | 0 | 0 | 0 | 0 |
| xylene | 0 | 0 | 0 | 35.8 | 0 | 0 | 0 | 0 | 0 | 31.5 | 0 | 0 | 35.4 | 27.5 | 0 |
| dimethylbenzylamine | 0 | 0 | 0 | 0.3 | 0 | 0 | 0 | 0.2 | 0 | 0 | 0 | 0 | 0 | 0 | 0 |
| styrene | 0 | 0 | 0 | 0 | 0 | 0 | 0 | 0 | 12.4 | 0 | 9.9 | 0 | 0 | 5.0 | 9.9 |
| methylmethacrylate | 13.1 | 9.7 | 12.0 | 14.1 | 14.6 | 0 | 0 | 8.9 | 12.3 | 0 | 11.5 | 5.8 | 9.7 | 8.5 | 5.0 |
| butylmethacrylate | 0 | 0 | 0 | 0 | 0 | 8.8 | 8.9 | 0 | 0 | 0 | 0 | 0 | 0 | 12.4 | 0 |
| methylacrylate | 0 | 12.4 | 12.5 | 29.6 | 0 | 29.8 | 13.3 | 0 | 12.4 | 0 | 0 | 0 | 16.0 | 0 | 7.2 |
| ethylacrylate | 14.7 | 0 | 0 | 0 | 14.6 | 0 | 0 | 12.3 | 0 | 0 | 12.4 | 12.4 | 0 | 0 | 0 |
| butylacrylate | 0 | 12.4 | 12.5 | 0 | 0 | 0 | 0 | 0 | 0 | 14.2 | 0 | 12.4 | 0 | 0 | 12.4 |
| ethylhexylacrylate | 16.7 | 0 | 0 | 0 | 0 | 0 | 7.4 | 11.6 | 12.4 | 0 | 12.4 | 0 | 16.0 | 12.4 | 0 |
| hydroxyethylmethacrylate | 0 | 0 | 0 | 0 | 0 | 0 | 2.8 | 0 | 0 | 2.7 | 0 | 0 | 0 | 2.3 | 0 |
| hydroxyethylacrylate | 0 | 0 | 2.1 | 0 | 0 | 2.5 | 0 | 0 | 0 | 0 | 0 | 0 | 2.7 | 0 | 0 |
| methacrylic acid | 2.0 | 0 | 0 | 0.7 | 0 | 0 | 0 | 0.7 | 0 | 0 | 0 | 0 | 1.0 | 0 | 0 |
| isobutoxymethyl-methacrylamide | 20.4 | 6.3 | 6.1 | 4.9 | 0 | 18.2 | 12.2 | 12.3 | 12.4 | 14.2 | 9.1 | 0 | 13.1 | 0 | 0 |
| n-butoxymethyl-methacrylamide | 0 | 2.5 | 0 | 0 | 14.6 | 0 | 0 | 0 | 0 | 0 | 0 | 5.0 | 0 | 0 | 10.1 |

TABLE 1-continued

|  | I wt.% | II wt.% | III wt.% | IV wt.% | V wt.% | VI wt.% | VII wt.% | VIII wt.% | IX wt.% | X wt.% | XI wt.% | XII wt.% | XIII wt.% | XIV wt.% | XV wt.% |
|---|---|---|---|---|---|---|---|---|---|---|---|---|---|---|---|
| methoxymethyl-methacrylamide | 0 | 6.3 | 4.6 | 0 | 14.6 | 0 | 5.9 | 0 | 0 | 0 | 0 | 10.2 | 6.4 | 9.1 | 5.0 |
| benzoylperoxide | 0 | 0.5 | 0 | 0 | 0 | 1.2 | 1.2 | 1.0 | 0.5 | 0 | 0 | 0 | 0 | 0 | 0 |
| azobisisobutyronitrile | 0 | 0 | 0 | 0.5 | 1.2 | 0 | 0 | 0 | 0 | 0 | 0 | 0 | 0 | 0 | 0 |
| tert. butylperbenzoate | 1.0 | 0.3 | 0.5 | 0 | 0.2 | 0.2 | 0.3 | 0.2 | 0.2 | 0.7 | 0.7 | 0.7 | 1.0 | 0.7 | 1.0 |
| mercaptoethanol | 3.3 | 0 | 0 | 0 | 0 | 0 | 0 | 0 | 0 | 0 | 0 | 0 | 0 | 0 | 0 |

TABLE 2

|  | I | II | III | IV | V | VI | VII | VIII | IX | X | XI | XII | XIII | XIV | XV |
|---|---|---|---|---|---|---|---|---|---|---|---|---|---|---|---|
| viscosity 23° C. (dPas) | 28 | 20 | 52 | 200 | 315 | 250 | 80 | 18 | 7.2 | 55 | 30 | 15 | 17 | 65 | 40 |
| solids content (%) | 72.1 | 49.6 | 50.1 | 51.2 | 61.6 | 60.9 | 59.3 | 48.8 | 49.6 | 50.3 | 51 | 49.4 | 50.2 | 48.7 | 49.3 |
| acid number (ISO 3682) | 20 | 0 | 0 | 10 | 0 | 0 | 0 | 10 | 0 | 0 | 0 | 0 | 10 | 0 | 0 |
| OH number (theoretical) | 0 | 0 | 20 | 0 | 0 | 0 | 20 | 0 | 0 | 20 | 0 | 0 | 20 | 20 | 0 |

EXAMPLES XVI–XXX

Preparation of coating materials

The components mentioned in table 3 were mixed at 20° C. (the quantities are given in parts by weight).

The polymers used in examples XVI–XXX were the polymers according to examples I–XV, respectively.

Nitrocellulose E 510 and Vinylite VROH were dissolved in: ethylacetate (30 parts by weight), methylisobutylketone (30 parts by weight), xylene (40 parts by weight) Paratolene sulphonic acid, camphor sulphonic acid and methane sulphonic acid were dissolved in ethanol.

The formaldehyde emissions (Table 4) of the coating materials according to examples XVI–XXX were determined by means of the 'ventilated interstice system,' described in Proceedings Fatipec 1982, Liege, Volume II, pp. 140–142).

TABLE 3

|  | XVI | XVII | XVIII | XIX | XX | XXI | XXII | XXIII | XXIV | XXV | XXVI | XXVII | XXVIII | XXIX | XXX |
|---|---|---|---|---|---|---|---|---|---|---|---|---|---|---|---|
| polymer | 100 | 100 | 100 | 100 | 100 | 100 | 100 | 100 | 100 | 75 | 75 | 75 | 75 | 75 | 75 |
| Nitrocellulose E 510 (20%)[1] | 40 | 40 | 40 | 40 |  |  |  |  |  | 40 | 40 | 40 |  |  |  |
| Vinylite VROH (20%)[2] |  |  |  |  | 40 | 40 | 40 | 40 | 40 |  |  |  | 40 | 40 | 40 |
| Kronos-RHD[3] | 150 |  | 150 | 150 |  | 150 |  |  |  | 150 |  |  | 150 |  | 150 |
| Uracron-TP-637[4] |  |  |  |  |  |  |  |  |  |  | 50 |  |  | 50 | 50 |
| Uracron-2554-DJ-55[5] |  |  |  |  |  |  |  |  |  |  |  | 50 |  | 50 |  |
| Uralac-170-X-70[6] |  |  |  |  |  |  |  |  |  |  |  | 50 |  |  |  |
| ethanol | 20 | 20 | 20 | 20 | 20 | 20 | 20 | 20 | 20 | 20 | 20 | 20 | 20 | 20 | 20 |
| butylacetate | 30 | 30 | 30 | 30 | 30 | 30 | 30 | 30 | 30 | 30 | 30 | 30 | 30 | 30 | 30 |
| p-toluene sulphonic acid (20%) | 10 | 10 | 10 |  |  |  | 10 | 10 | 10 |  |  |  |  |  | 10 |
| camphor sulphonic acid (20%) |  |  |  | 15 | 15 |  |  |  |  |  |  |  | 15 | 15 |  |
| methane sulphonic acid (10%) |  |  |  |  |  | 8 | 8 |  |  |  | 7 | 7 |  |  |  |

[1]Nitrocellulose E 510: nitrocellulose; Wolff, Walsrode
[2]Vinilyte VROH: hydrofunctional vinylchloride copolymer; Union Carbide
[3]Kronos-RHD: titaniumdioxide; Kronos
[4]Uracron-TP-637: hydroxyacrylate; DSM Resins
[5]Uracron-2554-DJ-55: hydroxyacrylate; DSM Resins
[6]Uralac-170-X-70: alkyd resin; DSM Resins.

TABLE 4

| Coating material according to example | peak time (min) | Formaldehyde concentration (mg/m$^3$) | | | | | |
|---|---|---|---|---|---|---|---|
|  |  | emission peak (mg/m$^3$) | F-EM** 30 (min) | F-EM 60 (min) | F-EM 360 (min) | F-EM 24 hour | F-EM 1 week | F-EM 2 weeks |
| XVI | 40 | 6.60 | 3.90 | 3.00 | 2.20 | 1.20 | 0.90 | 0.40 |
| XVII | 58 | 8.40 | 5.20 | 4.40 | 1.80 | 1.00 | 0.70 | 0.30 |
| XVIII | 44 | 4.20 | 2.10 | 2.60 | 1.10 | 0.70 | 0.40 | 0.10 |
| XIX | 47 | 2.40 | 1.80 | 1.80 | 0.80 | 0.50 | 0.30 | 0.10 |
| XX | 40 | 6.90 | 4.00 | 5.60 | 1.60 | 0.90 | 0.60 | 0.20 |
| XXI | 40 | 11.20 | 7.00 | 5.60 | 1.80 | 1.20 | 0.60 | 0.10 |
| XXII | 45 | 5.10 | 3.10 | 2.90 | 1.00 | 0.70 | 0.40 | 0.10 |
| XXIII | 52 | 6.80 | 3.40 | 3.30 | 1.40 | 1.80 | 0.30 | 0.10 |
| XXIV | 50 | 7.50 | 4.20 | 3.30 | 0.80 | 0.60 | 0.50 | 0.30 |
| XXV | 46 | 4.80 | 2.50 | 2.30 | 1.80 | 1.30 | 1.00 | 0.30 |
| XXVI | 40 | 5.20 | 3.90 | 2.80 | 1.20 | 0.90 | 0.70 | 0.20 |
| XXVII | 43 | 5.30 | 2.90 | 1.40 | 0.60 | 0.50 | 0.40 | 0.20 |
| XXVIII | 47 | 4.90 | 2.70 | 2.20 | 1.30 | 0.90 | 0.40 | 0.20 |

TABLE 4-continued

| Coating material according to example | peak time (min) | Formaldehyde concentration (mg/m$^3$) | | | | | |
|---|---|---|---|---|---|---|---|
| | | emission peak (mg/m$^3$) | F-EM** 30 (min) | F-EM 60 (min) | F-EM 360 (min) | F-EM 24 hour | F-EM 1 week | F-EM 2 weeks |
| XXVIX | 42 | 2.70 | 1.90 | 1.60 | 0.80 | 0.60 | 0.40 | 0.20 |
| XXX | 38 | 3.70 | 2.50 | 2.20 | 1.10 | 0.60 | 0.50 | 0.20 |

**F-EM = formaldehyde emission

The coating materials XVI-XXX were further subjected to a number of other tests, the results of which are shown in table 5.

TABLE 5

| | XVI | XVII | XVIII | XVIX | XX | XXI | XXII | XXIII |
|---|---|---|---|---|---|---|---|---|
| dust dry (min) | 20 | 8 | 11 | 20 | 18 | 7 | 6 | 15 |
| tack free (min) | 40 | 15 | 18 | 45 | 32 | 10 | 9 | 29 |
| hardness (DIN 53157) | | | | | | | | |
| after 1 hour | 25 | 40 | 35 | 15 | 20 | 35 | 38 | 25 |
| after 6 hours | 60 | 65 | 60 | 30 | 33 | 75 | 70 | 52 |
| after 1 day | 63 | 90 | 96 | 60 | 71 | 105 | 96 | 63 |
| after 1 week | 85 | 120 | 111 | 112 | 115 | 120 | 110 | 102 |
| solvent resistance (after 1 week)* | | | | | | | | |
| acetone (10 sec.) | 3 | 4 | 5 | 3 | 5 | 5 | 5 | 4 |
| ethanol 50% (1 hour) | 3 | 4 | 5 | 2.5 | 5 | 5 | 5 | 4 |
| ethylbutylacetate (1 h) | 3 | 4.5 | 5 | 2.5 | 5 | 5 | 5 | 4 |
| elasticity* | | | | | | | | |
| cold check (50 cycles) | 5 | 4 | 4.5 | 4 | 3 | 5 | 4 | 4.5 |

| | XXIV | XXV | XXVI | XXVII | XXVIII | XXIX | XXX |
|---|---|---|---|---|---|---|---|
| dust dry (min) | 16 | 14 | 15 | 7 | 17 | 9 | 10 |
| tack free (min) | 32 | 28 | 32 | 11 | 31 | 19 | 21 |
| hardness (DIN 53157) | | | | | | | |
| after 1 hour | 30 | 33 | 40 | 25 | 20 | 29 | 35 |
| after 6 hours | 62 | 62 | 71 | 49 | 40 | 72 | 71 |
| after 1 day | 77 | 80 | 96 | 74 | 79 | 85 | 91 |
| after 1 week | 110 | 114 | 119 | 100 | 107 | 103 | 122 |
| solvent resistance (after 1 week)* | | | | | | | |
| acetone (10 sec.) | 3.5 | 4.5 | 3.5 | 4 | 4 | 4 | 4.5 |
| ethanol 50% (1 hour) | 4 | 5 | 4 | 4 | 4.5 | 3.5 | 4 |
| ethylbutylacetate (1 h) | 3.5 | 5 | 4 | 4.5 | 4.5 | 3.5 | 5 |
| elasticity* | | | | | | | |
| cold check (50 cycles) | 4 | 4 | 3 | 4.5 | 4 | 4 | 4 |

*where:
5 = very good
4 = good
3 = reasonable
2 = moderate
1 = poor

We claim:

1. Process for the preparation of a coating on a substrate, characterized in that a resin composition which is applied to the substrate and contains
   (1) 20-85 parts by weight of an alkoxy groups containing polymer consisting of
      (a) 1-40 wt. % (C$_1$-C$_6$) alkoxymethyl ether of acryl- or methacrylamide
      (b) 20-85 wt. % (C$_1$-C$_{12}$) alkyl esters of acrylic or methacrylic acid
      (c) 0-40 wt. % hydroxyalkyl(meth)acrylate, acrylic or methacrylic acid, acryl- or methacrylamide or mixtures thereof
      (d) 0-50 wt. % vinylaromatic compound and
      (e) 0-40 wt. % other monomers
   (2) 0-80 parts by weight of hydroxy, carboxy or amide containing polymer and
   (3) 15-60 parts by weight of organic solvents is caused to cure at a temperature between 5° and 60° C. in the presence of an acid catalyst.

2. Process according to claim 1, wherein the resin composition contains
   (1) 20-85 parts by weight of alkoxy groups containing polymer consisting of
      (a) 1-40 wt. % (C$_1$-C$_6$)-alkoxymethyl ether of acryl- or methacrylamide
      (b) 20-85 wt. % (C$_1$-C$_6$)-alkyl esters of acrylic or methacrylic acid
      (c) 0-5 wt. % hydroxyalkyl(meth)acrylate, acrylic or methacrylic acid, acryl- or methacrylamide or mixtures thereof
      (d) 0-50 wt. % vinylaromatic compound and
      (e) 0-40 wt. % other monomers;
   (2) 10-80 parts by weight of hydroxy, carboxy or amide containing polymer; and
   (3) 15-60 parts by weight of organic solvent.

3. Process according to claim 1, wherein the alkoxy groups containing polymer contains 10-25 wt. % (C$_1$-C$_6$) alkoxy methyl ether of acryl- or methacrylamide.

4. Process according to claim 1, wherein the resin composition contains as solvent at least, relative to the alkoxy groups containing polymer, 5 wt. % alcohol with 1-12 carbon atoms.

5. Process according to claim 2, wherein the resin compositions contains as solvent at least, relative to the alkoxy groups containing polymer, 5 wt. % alcohol with 1-12 carbon atoms.

6. Process according to claim 1, wherein the alkoxy groups containing polymer contains (a) 1–40 wt. % ($C_1$–$C_6$) alkoxymethyl ether of acryl- or methacrylamide
(b) 20–85 wt. % ($C_1$–$C_{12}$) alkyl esters of acrylic or methacrylic acid
(c) 5–15 wt. % hydroxyalkyl(meth)acrylate, acrylic or methacrylic acid, acryl- or methacrylamide or mixtures thereof
(d) 0–50 wt. % vinylaromatic compound and
(e) 0–40 wt. % other monomers.

7. Process according to claim 6, wherein the alkoxy groups containing polymer contains a ($C_1$–$C_4$) alkoxymethyl ether of acryl- or methacrylamide.

8. Process according to claim 7, wherein the ($C_1$–$C_4$) alkoxymethylether of acryl- or methacrylamide contains isobutoxymethylmethacrylamide.

9. Process according to claim 1 wherein said coating is cured at room temperature.

* * * * *

UNITED STATES PATENT AND TRADEMARK OFFICE
CERTIFICATE OF CORRECTION

PATENT NO. : 4,970,096

DATED : November 13, 1990

INVENTOR(S) : RIETBERG, et al.

It is certified that error appears in the above-identified patent and that said Letters Patent is hereby corrected as shown below:

Column 8;
 Claim 5, line 65, delete "compositions" and insert
    -- composition --.

Column 4, line 13, delete "drying" and
    insert -- drying, --.
Column 3 & 4;
 Table I, column III, delete "2.2" and
    insert -- 22.2 --.

Column 6, line 28, delete "paratolene" and
    insert -- paratoluene --.

Signed and Sealed this

Seventh Day of July, 1992

Attest:

DOUGLAS B. COMER

*Attesting Officer*   Acting Commissioner of Patents and Trademarks